United States Patent Office 2,943,015
Patented June 28, 1960

2,943,015

O:O'-DIETHYL S-(β-DIMETHYL AMINO-β-METHYL)-PROPYL PHOSPHOROTHIOLATES AND PESTICIDAL COMPOSITIONS CONTAINING SAME

Alan Calderbank and Ranajit Ghosh, Manchester, England, assignors to Imperial Chemical Industries Limited, London, England, a corporation of Great Britain No Drawing. Filed Oct. 21, 1957, Ser. No. 691,122
Claims priority, application Great Britain Oct. 19, 1956

9 Claims. (Cl. 167—22)

This invention relates to a new organic compound and more particularly it relates to O:O'-diethyl S-(β-dimethylamino-β-methyl)propyl phosphorothiolate and its acid addition salts thereof.

United Kingdom patent specification No. 738,839 (corresponding with U.S. patent No. 2,863,901) describes new basic esters of phosphorothiolic acid of the general formula:

$$O=P(OR_1)(OR_2)-S-LX$$

in which $R_1$ and $R_2$ stand for like or unlike alkyl radicals, L stands for a saturated straight- or branched-chain aliphatic hydrocarbon radical or for such a radical in which the carbon atoms are interrupted by an oxygen or sulphur atom or by a nitrogen atom carrying an alkyl substituent and X stands for a secondary aliphatic or heterocyclic amine attached to L through the amino nitrogen atom which are stated to have outstanding pesticidal properties.

We have now found that the compound O:O'-diethyl S - (β-dimethylamino-β-methyl)propyl phosphorothiolate and its acid addition salts possess pesticidal properties which are superior to those pesticidal properties possessed by the compounds disclosed in the said United Kingdom patent specification No. 738,839.

Thus according to the invention we provide the new compound O:O'-diethyl S-(β-dimethylamino-β-methyl) propyl phosphorothiolate of the formula:

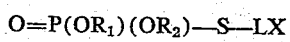

and its acid addition salts thereof.

As particularly useful acid addition salts there may be mentioned for example those addition salts derived from oxalic acid, toluene-p-sulphonic acid, hydrochloric acid, phosphoric acid and picric acid.

According to a further feature of the invention we provide a process for the manufacture of the said new compound which comprises heating a compound of the formula:

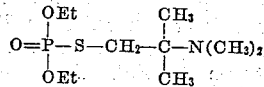

wherein Y stands for a halogen atom, either with a compound of the formula:

wherein, $R_3$ and $R_4$, one stands for hydrogen and the other stands for a methyl radical, in the presence of an acid-binding agent, or with a metal derivative of the said compound of the formula:

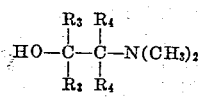

wherein M stands for a metal atom and $R_3$ and $R_4$ have the meaning stated above.

Suitable acid-binding agents may be for example an alkali metal carbonate for example sodium carbonate. As a suitable metal derivative there may be mentioned for example an alkali metal derivative for example the sodium derivative. The reaction may be carried out in the presence of an inert diluent or solvent for example benzene.

The process may be conveniently carried out by heating together for example O:O'-diethylphosphorochloridothionate and the sodium derivative of 1-dimethylamino-2-methylpropanol-2 or 2-dimethylamino-2-methylpropanol-1 under reflux in benzene for about four hours. The crude product may be purified by conversion to a picrate from which O:O'-diethyl S-(β-dimethylamino-β-methyl)-propyl phosphorothiolate picrate is obtained as a crystalline solid, M.P. 112–113° C.

It is suggested, but this suggestion is put forward only by way of explanation, that during the process of manufacture some isomerisation may take place leading to migration of the sulphur atom and/or certain methyl radicals.

According to a further feature of the invention we provide a process for the manufacture of the said new compound which comprises heating a compound of the formula:

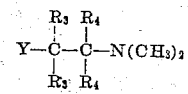

wherein Y, $R_3$ and $R_4$ have the meaning stated above, either with a compound of the formula:

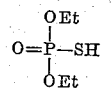

in the presence of an acid-binding agent, or with a metal derivative of the said compound of the formula:

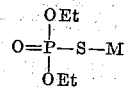

wherein M has the meaning stated above.

As a suitable metal derivative there may be mentioned for example an alkali metal derivative for example the sodium derivative. The reaction may be carried out in the presence of an inert diluent or solvent for example ethanol.

The process may thus be carried out by heating sodium O:O'-diethyl phosphorothiolate either with 1-dimethylamino-2-chloro-2-methylpropane or with 1-chloro-2-dimethylamino-2-methylpropane in the presence of ethanol. The crude product may be purified by conversion to a picrate from which O:O'-diethyl S-(β-dimethylamino-β-methyl)propyl phosphorothiolate picrate is obtained as a crystalline solid, M.P. 112–113° C.

It is suggested, but this suggestion is put forward only by way of explanation, that during the process of manufacture, some isomerisation may take place leading to migration of certain methyl radicals.

The new compound with which this invention is concerned O:O'-diethyl S-(β-dimethylamino-β-methyl)-propyl phosphorothiolate and its acid addition salts thereof, for example the said picrate, M.P. 112–113° C., is superior, as a pesticidal agent, for example as an acaricidal agent, to the compounds described in United Kingdom patent specification No. 738,839 for example it is superior to O:O'-diethyl S-β-diethylaminoethyl phosphorothiolate. This superiority is demonstrated by its contact/residual toxicity to adult female mites of *Tetranychus*

*telarius* and by its systemic activity by root or leaf absorption in French bean plants infested with *Tetranychus telarius*.

Thus according to still a further feature of the invention we provide pesticidal compositions containing O:O'-diethyl S-(β-dimethylamino-β-methyl)-propyl phosphorothiolate and/or its acid addition salts thereof, as the active pesticidal ingredient or ingredients.

The said pesticidal compositions may contain also for example a carrier and if desired, an auxiliary agent and/or a plant nutrient.

The said new pesticidal compositions may be in a form suitable for direct application or they may be in a concentrated form suitable for application after dilution. Although as will be shown more fully below the simplest compositions of this feature of the invention consist only of very dilute aqueous solutions of the salts of the new compound and it is expected that such solutions or modifications thereof will find wide application, nevertheless we include in our invention compositions which contain carriers other than water, compositions which contain auxiliary agents and compositions which contain plant nutrients as well as compositions which contain two or more of these ingredients in addition to the said salts. Carriers, auxiliary agents and plant nutrients do not comprise completely independent categories as some substances can be used which act in two of these categories.

The carriers may be liquids or solids. As liquids there may be used particularly in connection with the said salts water, as already mentioned, and non-phytocidal organic solvents. These liquids may be used both for compositions for direct application and for compositions in concentrated form suitable for use after dilution. Solid carriers include inert pulverulent diluents, e.g. talc, kieselguhr, bentonite and other colloidal clays and powdered chalk. These carriers are used almost entirely for making pulverulent preparations for direct application. For concentrated solid preparations there may be used other solid carriers and more particularly water-soluble organic and inorganic compounds; with these the toxic ingredient may be incorporated to give a shaped tablet or block or a non-hygroscopic free-flowing granular preparation. Solids which have auxiliary or plant-nutrient properties can, in suitable cases, be used as carriers.

As auxiliary agents we means substances other than carriers which assist in the preparation and handling of the compositions or in their application or which increase their effectiveness. Such auxiliary agents comprise a miscellany of substances. Thus in making pulverulent compositions, dust-binding agents such as spindle-oil, glycerol and wool fat may be used. Wetting, spreading and dispersing agents such as sodium dinaphthylmethane disulphonate and sodium lauryl sulphate and substances adapted to promoted adhesion or so-called sticking agents, such as glue and resin, may be used especially in liquid preparations. Plant nutrients, i.e. nutrients which are applied directly to the leaves or other above-ground portions of the plant as distinct from fertilisers which are applied directly to the plant through the ground (and which are coming into increasing use) include such substances as urea and magnesium sulphate.

Plant nutrients can, we have found, be incorporated into the compositions of this invention and the resulting products can be applied to plants and in this way results which would otherwise need two applications to the plants can be obtained by means of a single application. Moreover certain plant nutrients can in some preparations play the part of carrier. Thus solid preparations may be made consisting of urea and at least one of the said new quaternary salts which can be dissolved in water to yield solutions which can be applied as combined nutritive-pesticidal washes and sprays.

In giving examples of specific carriers, auxiliary agents and plant nutrients and specific types of these as well as specific modes of incorporation, we do this by way of illustration only and not by way of confining the invention to any or all of these.

For most purposes aqueous formulations are not only the most efficacious in action, but also the easiest in application and the most simple in preparation. Moreover the aqueous preparations can in nearly all cases be aqueous solutions, as even with the less soluble acid addition salts, the solubility is in most cases sufficient to give the very dilute solutions, which are all that are needed for effective action against certain plant-feeding mites and insects.

The invention is illustrated but not limited by the following examples in which the parts are by weight.

*Example 1*

A mixture of 2.2 parts of 1-dimethylamino-2-methyl-propanol-2, 0.5 part of sodium and 25 parts of benzene is heated under reflux until the sodium no longer effervesces. Residual traces of sodium are removed by filtration. 4.5 parts of O:O'-diethylphosphorochloridothionate are added to the filtrate and the mixture is then heated under reflux during 4 hours. The reaction mixture is then kept at 18–23° C. during 18 hours and is then washed twice with 10 parts of water each time. It is then dried and evaporated. The oily residue is distilled and there is thus obtained a product, B.P. 102–106° C./0.25 mm. 0.8 part of this product is treated with 1 part of picric acid dissolved in 15 parts of ethanol and the crystalline picrate so obtained is crystallised from 5 parts of ethanol to give O:O'-diethyl S-(β-dimethylamino-β-methyl)propyl phosphorothiolate picrate M.P. 112–113° C.

*Example 2*

A mixture of 13 parts of 2-dimethylamino-2-methyl-propanol-1, 2.3 parts of sodium and 130 parts of toluene is heated under reflux until the sodium is dissolved. After cooling to 20–25° C., there is added dropwise, during 15 minutes, 18.85 parts of O:O'-diethylphosphorochloridothionate. The reaction mixture is then heated under reflux for 2 hours and is then cooled. It is washed three times with 50 parts of water each time and then dried and the toluene is evaporated in vacuo. The residual oil is distilled to give a product, B.P. 101–108° C./0.25 mm. 2.7 parts of this product are treated with 2.3 parts of picric acid dissolved in 40 parts of ethanol and the crystalline picrate so obtained is crystallised from 20 parts ethanol to give O:O'-diethyl S-(β-dimethylamino β-methyl)propyl phosphorothiolate picrate, M.P. 112–113° C.

*Example 3*

A mixture of 13.5 parts of freshly distilled basic chloride (prepared by interaction of thionyl chloride and 2-dimethylamino - 2 - methylpropanol - 1 according to the known art), 21 parts of sodium O:O'-diethylphosphorothioate and 100 parts of ethanol is kept at 18–23° C. during 18 hours. The reaction mixture is then heated under reflux during 6 hours. It is then cooled and filtered and the filtrate is concentrated in vacuo. The residue is diluted with water and the mixture extracted three times using 25 parts of ether each time. The combined extracts are dried and evaporated and the residue is a product of B.P. 85–89° C./0.12 mm. 1.5 parts of this product are treated with 1.65 parts of picric acid dissolved in 25 parts of ethanol and the crystalline picrate so obtained is crystallised from 10 parts of ethanol to give O:O'-diethyl S-(β-dimethylamino β-methyl)propyl phosphorothiolate picrate, M.P. 112–113° C.

What we claim is:

1. The new compound of the group consisting of O:O'-diethyl S-(β-dimethylamino-β-methyl)propyl phosphorothiolate of the formula:

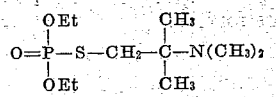

and its acid addition salts thereof.

2. Acid addition salts, as claimed in claim 1, which are derived from an acid selected from the group consisting of oxalic acid, toluene-p-sulphonic acid, hydrochloric acid, phosphoric acid and picric acid.

3. Pesticidal compositions containing at least one member of the group consisting of O:O'-diethyl S-(β-dimethylamino-β-methyl)-propyl phosphorothiolate and the acid addition salts thereof, as the active pesticidal ingredient.

4. Compositions as claimed in claim 3 including an inert pesticidal carrier.

5. Compositions as claimed in claim 4 wherein the carrier is a liquid carrier selected from the group consisting of water and a non-phytocidal organic solvent.

6. Compositions as claimed in claim 4 wherein there are present wetting, spreading and dispersing agents and sticking agents.

7. Compositions as claimed in claim 4 including a plant nutrient selected from the group consisting of urea and magnesium sulphate.

8. Compositions as claimed in claim 4 wherein the carrier is a solid carrier selected from the group consisting of an inert pulverulent diluent.

9. Compositions as claimed in claim 8 wherein there is present a dust-binding agent selected from the group consisting of spindle-oil, glycerol and wool fat.

References Cited in the file of this patent

UNITED STATES PATENTS

| | | |
|---|---|---|
| 2,095,366 | Marsico | Oct. 12, 1937 |
| 2,333,061 | Van Over | Oct. 26, 1943 |
| 2,586,656 | Hook et al. | Feb. 19, 1952 |
| 2,589,675 | Cook et al. | Mar. 18, 1952 |
| 2,596,076 | Hook et al. | May 6, 1952 |
| 2,597,534 | Schrader | May 20, 1952 |
| 2,611,728 | Bartlett | Sept. 23, 1952 |
| 2,736,726 | Gaetzi et al. | Feb. 28, 1956 |
| 2,841,517 | Boon et al. | July 1, 1958 |
| 2,863,901 | Ghosh | Dec. 9, 1958 |